No. 714,691. Patented Dec. 2, 1902.
G. P. HARRIS.
SEED COTTON ELEVATOR.
(Application filed Jan. 17, 1900.)
(No Model.) 2 Sheets—Sheet I.
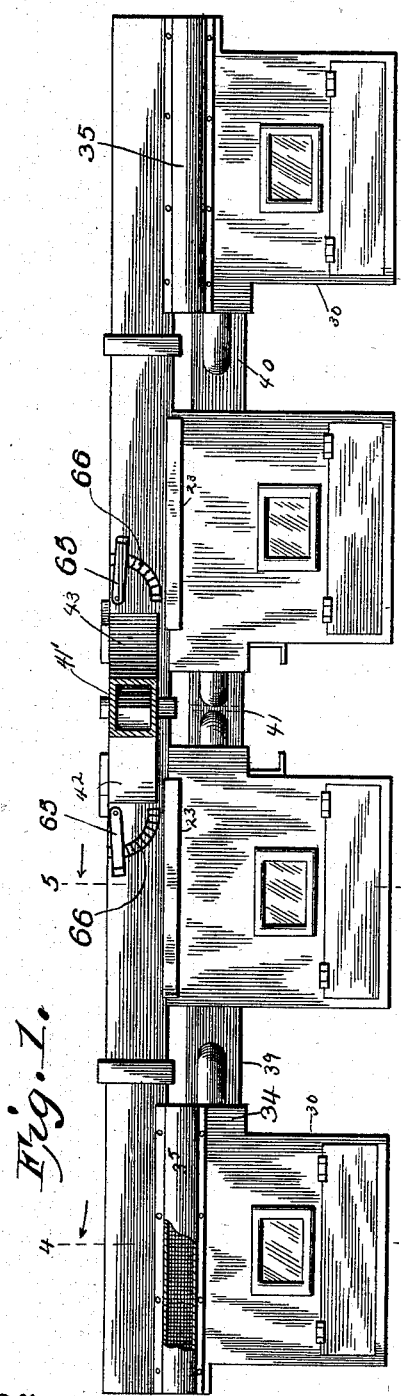
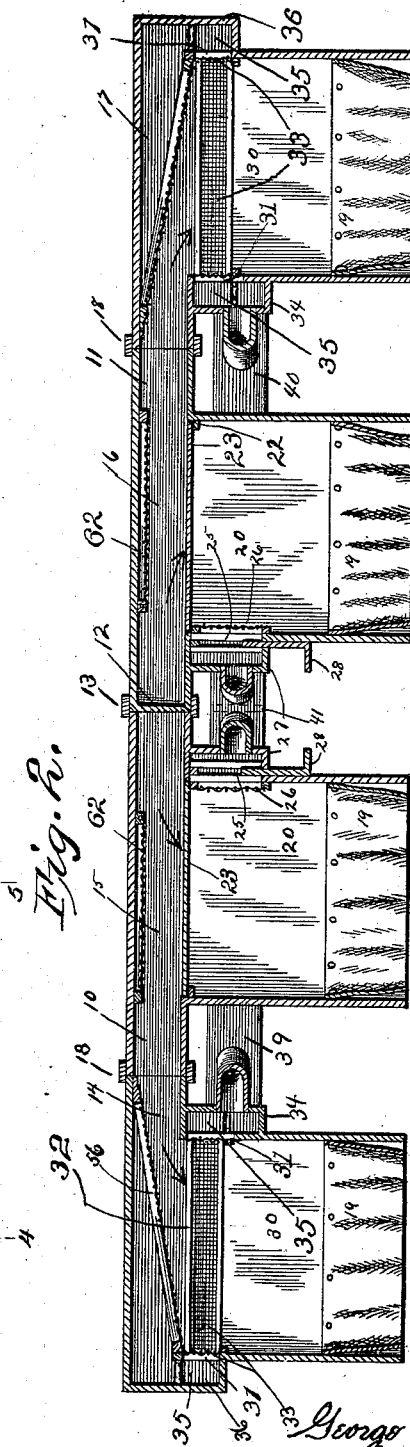
Witnesses
Inventor
George P. Harris No. 714,691. Patented Dec. 2, 1902.
G. P. HARRIS.
SEED COTTON ELEVATOR.
(Application filed Jan. 17, 1900.)
(No Model.) 2 Sheets—Sheet 2.
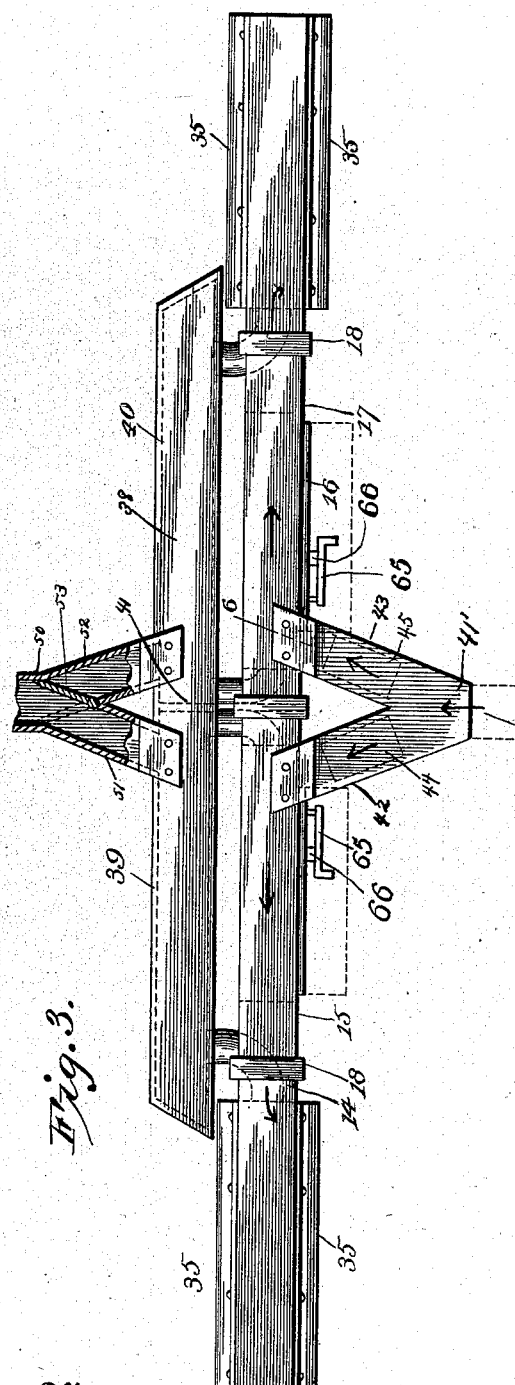

UNITED STATES PATENT OFFICE.

GEORGE P. HARRIS, OF CHINA SPRING, TEXAS.

SEED-COTTON ELEVATOR.

SPECIFICATION forming part of Letters Patent No. 714,691, dated December 2, 1902.

Application filed January 17, 1900. Serial No. 1,768. (No model.)

*To all whom it may concern:*

Be it known that I, GEORGE P. HARRIS, a citizen of the United States, residing at China Spring, in the county of McLennan, State of Texas, have invented certain new and useful Improvements in Seed-Cotton Elevators; and I do hereby declare the following to be a full, clear, and exact description of the invention, such as will enable others skilled in the art to which it appertains to make and use the same.

This invention relates to cotton-elevators; and it has for its object to provide an elevator which will be applicable to any ordinary style of gin-feeder and in which there will be a positive and efficient feed and in which the feed will be distributed evenly between the several feeders.

In the drawings forming a portion of this specification, and in which like numerals of reference indicate similar parts in the several views, Figure 1 is a side elevation of the cotton-elevator with the cotton-suction pipe in section. Fig. 2 is a horizontal section taken through the cotton-trunk and feeders. Fig. 3 is a top plan view of Fig. 1. Fig. 4 is a section on line 4 4 of Fig. 1. Fig. 5 is a section on line 5 5 of Fig. 1. Fig. 6 is a section on line 6 6 of Fig. 3.

Referring now to the drawings, in constructing an elevator in accordance with my invention there is formed a cotton-trunk divided into sections 10 and 11 through the medium of a transverse partition 12, the sections being separable and connected end to end by means of a collar 13, as shown. Each section is itself formed in parts or divisions 14 and 15 and 16 and 17, respectively, the divisions of each section being connected by means of collars 18, as shown.

Opening into the under sides of divisions 15 and 16 are rectangular discharge-chutes 20, having cloth valve-linings adjacent their lower ends and in one side of each of which chutes is a horizontal slot 21, (shown in Fig. 5,) and in line with which slots are guideways 22 upon the ends of the chutes, adapted to receive cut-off slides or valves 23 to open and close and also to vary the communication between the cotton-trunk and chutes.

In the inner or adjacent end walls of the chute are formed openings 25, having foraminous covering 26 upon their inner sides and communicating with the boxes 27 upon the outer faces of the inner sides. Slides or valves 28 are disposed in slots in the boxes 27 and through the medium of which the extent of the openings may be varied.

At each end of the cotton-trunk is a chute 30, which communicates at its upper end with the lower side of the trunk. In the ends of the upper portion of each chute 30 are openings 31, while in the sides of the upper end portions of the chutes are openings 32, said openings 31 and 32 being provided with screens 33, as shown. Attached to the sides of each chute 30 are the semicylindrical plates 35, forming boxes, with which the screened openings 32 communicate. The plates 35 project at their ends beyond the ends of the chute, and these projecting portions form the outer sides of additional boxes at the ends of the chute, with which the screened end openings 31 communicate. The box 34 at the inner end of the chute is connected directly with the air or wind trunk, hereinafter described. The outer end of the cotton-trunk is continued downwardly, as shown at 36, and forms the outer wall of the box at that end of the chute, as shown. Thus there is formed a continuous suction box or passage around the upper end of each chute 30 and with which the upper portion of the chute communicates through the screened openings in the sides and ends of the chute.

An air or wind trunk 38 is arranged at one side of the chutes 20 and 30 and is divided into two parts 39 and 40 by means of a central partition 41. (Shown in dotted lines.) The part 40 is connected with the boxes 27 and 34 at one side of partition 12, while the boxes 27 and 34 at the other side of the partition are connected with the part 39.

A bifurcated cotton-exhaust pipe 41' has its bifurcations 42 and 43 connected with the divisions 15 and 16, respectively, near their mutually-adjacent ends, and which bifurcations are provided with inwardly-opening valves 44 and 45 to allow the inward passage of cotton from the suction-pipe and to prevent outward passage thereof. Each of the valves 44 and 45 consists of a block, which may be of wood and to which is attached a section of canvas or other suitable fabric 45', which latter is attached to the upper wall of the exhaust-pipe, as shown in Fig. 6 of the drawings, this fabric forming a hinge for the valve, and also by falling around the valve it prevents leakage when subjected to back pressure.

A bifurcated exhaust-pipe 50, which may be provided with an air-exhaust fan of any desired style, has its bifurcations 51 and 52 connected with the wind-trunk at opposite sides of the partition therein, and has also a valve 53, through the medium of which the suction may be confined to either of the bifurcations 51 and 52 and therethrough to either section of the wind-trunk to create suction through the corresponding section of the cotton-trunk and upper portions of the chutes connected therewith.

When the suction is through the section 10, the valve-linings 19 of the chutes close said chutes, and air is sucked inwardly through the bifurcation 42 and valve 44 therein, closing valve 45 and drawing the cotton through the said bifurcation 42 and its valve to the cotton-trunk and thence to the chutes 20 and 30, communicating therewith. A slanting screen 56 extends from the outer end of the chute 30 to a part above the inner end thereof and directs the cotton to that chute. If the slides 23 are closed, the entire amount of cotton will pass to chute 30; but if the slide be open a portion will be drawn into chute 20.

When it is desired to lessen the amount of cotton delivered to chute 20, the suction thereof is decreased by moving the slide 28 inwardly to cover the side openings in the chute, and when it is desired to cut off the supply of cotton to chute 30 entirely a screen 62, hinged to the upper wall of the cotton-trunk, is lowered to lie with its lower end at the outer end of the chute 20 to prevent the passage of cotton therethrough.

To hold the screens 62 of both cotton-trunks in their raised positions, as shown in Fig. 2 of the drawings, said screens are provided with levers 65, connected thereto at their hinge ends and which levers lie exteriorly of the trunks and across the notched segments 66, with which the levers may be engaged. When the screens are to be raised, the levers 65 are operated and then engaged with the notched segments, as will be understood.

When the valve in the suction-pipe is moved to its opposite position, the suction in section 10 of the cotton-trunk and in the communicating trunk ceases and the cotton falls through the chutes and into the gin-feeder, the apparatus connected with section 11 of the cotton-chute then becoming active. Thus may the cotton be distributed first to one set and then to the other, and thus may the proportions delivered to the several chutes be regulated.

What is claimed is—

1. A cotton-elevator comprising a cotton-trunk having chutes communicating therewith, a wind-trunk, pipes leading from the wind-trunk to the chutes at points below the upper ends of the latter, and deflecting-screens in the cotton-trunk above the chutes, the screens of the inner trunks being movable into positions to block passage of cotton to the outer chutes or to clear the trunk, the inner chutes having means for closing their upper ends and the cotton-trunk having a feed-pipe connected therewith adjacent to the inner chutes.

2. A cotton-elevator comprising a cotton-trunk having chutes connected with the lower side thereof and opening thereinto, a wind-trunk, pipes connecting the wind-trunk with the chutes at points below the upper ends of the latter, a deflecting-screen disposed diagonally of the cotton-trunk above the outermost chute, a deflecting-screen adapted for movement into and out of position diagonally of the cotton-trunk and above the innermost chute, a closure for the upper end of the innermost chute, means for cutting off communication between the innermost chute and the wind-trunk, and a suction-pipe connected with the wind-trunk adjacent to said innermost chute.

In testimony whereof I affix my signature in the presence of two witnesses.

GEORGE P. HARRIS.

Witnesses:
M. T. BETTIS,
MATTIE BETTIS.